US012090798B2

(12) United States Patent
Shin et al.

(10) Patent No.: US 12,090,798 B2
(45) Date of Patent: Sep. 17, 2024

(54) CONTROL DEVICE AND METHOD FOR VARIABLE TIRE PRESSURE

(71) Applicants: Hyundai Motor Company, Seoul (KR); Kia Corporation, Seoul (KR)

(72) Inventors: Seong Su Shin, Whasung-Si (KR); Jang Won Hong, Whasung-Si (KR); Se Hoon Jung, Whasung-Si (KR)

(73) Assignees: Hyundai Motor Compnay, Seoul (KR); Kia Corporation, Seoul (KR)

(*) Notice: Subject to any disclaimer, the term of this patent is extended or adjusted under 35 U.S.C. 154(b) by 408 days.

(21) Appl. No.: 17/729,666

(22) Filed: Apr. 26, 2022

(65) Prior Publication Data

US 2023/0099037 A1  Mar. 30, 2023

(30) Foreign Application Priority Data

Sep. 30, 2021  (KR) .................. 10-2021-0130137

(51) Int. Cl.
*B60C 23/00* (2006.01)
*B60B 21/02* (2006.01)

(52) U.S. Cl.
CPC .......... *B60C 23/002* (2013.01); *B60B 21/02* (2013.01); *B60C 23/004* (2013.01)

(58) Field of Classification Search
CPC ......... B60B 21/00; B60B 21/02; B60B 21/12; B60B 25/00; B60C 23/00; B60C 23/001; B60C 23/002; B60C 23/004
See application file for complete search history.

(56) References Cited

U.S. PATENT DOCUMENTS 5,119,856 A * 6/1992 Zarotti .................. B60C 23/001
152/415

FOREIGN PATENT DOCUMENTS

| CN | 103303060 A | * | 9/2013 | |
|---|---|---|---|---|
| CN | 103600620 A | * | 2/2014 | |
| CN | 105437863 A | * | 3/2016 | |
| DE | 102017112534 A1 | * | 12/2018 | |
| JP | 2006182318 A | * | 7/2006 | ............ B60C 23/18 |
| KR | 10-2005-0088731 | | 9/2005 | |
| KR | 102177501 B1 | * | 11/2020 | |

* cited by examiner

*Primary Examiner* — Kip T Kotter
(74) *Attorney, Agent, or Firm* — Morgan, Lewis & Bockius LLP

(57) ABSTRACT

A control apparatus and method for varying tire pressure can improve fuel efficiency, energy efficiency, and driving performance by applying a bimetal to a rim portion of a wheel, inducing deformation of the bimetal by applying current to the bimetal according to conditions such as driving information and road information, and individually controlling air pressures of four tires of the front and rear wheels through the deformation of the bimetal.

20 Claims, 12 Drawing Sheets

FIG. 7

| CASE 2 | fuel economy improvement mode | | |
|---|---|---|---|
| situation | cruising | | |
| condition | - navigation: highway or high-speed road, no rain or snow<br>- vehicle speed: greater than 60km/h | | |

Front tires (vehicle front ↓):

| 2 (A2) | | | | 4 (A4) | | |
|---|---|---|---|---|---|---|
| air pressure | increase | | | air pressure | increase | |
| contact area | reduce | | | contact area | reduce | |
| rolling resistance | decrease | | | rolling resistance | decrease | |

| 1 (A1) | | | | 3 (A3) | | |
|---|---|---|---|---|---|---|
| air pressure | increase | | | air pressure | increase | |
| contact area | reduce | | | contact area | reduce | |
| rolling resistance | decrease | | | rolling resistance | decrease | |

FIG. 8

| CASE 3 | fuel economy improvement mode | | |
|---|---|---|---|
| situation | excessive rear passenger or cargo weight | | |
| condition | – front/rear wheel axle load ratio exceeds 10% in stopped state<br>– indoor ultrasonic sensor: confirms position of rear passenger | | |

| | | | |
|---|---|---|---|
| 2 — A2 | air pressure: normal<br>contact area: normal<br>rolling resistance: normal | 4 — A4 | air pressure: increase<br>contact area: reduce<br>rolling resistance: decrease |
| 1 — A1 | air pressure: normal<br>contact area: normal<br>rolling resistance: normal | 3 — A3 | air pressure: increase<br>contact area: reduce<br>rolling resistance: decrease |

⬇ vehicle front

FIG. 10

| CASE 5 | | |
|---|---|---|
| situation | braking performance improvement mode | |
| | rapid deceleration (longitudinal acceleration and air pressure inversely proportional) | |
| condition | -- wire/rain sensor: ON, navigation: rain or snow<br>-- vehicle acceleration (G) sensor: greater than 1G front and rear occurs | |

| | | |
|---|---|---|
| 2 (A2) | 4 (A4) | air pressure: normal / contact area: normal / rolling resistance: normal |
| 1 (A1) | 3 (A3) | air pressure: normal / contact area: normal / rolling resistance: normal |
| air pressure: decrease / contact area: increase / rolling resistance: increase | air pressure: decrease / contact area: increase / rolling resistance: increase | | vehicle front ⬇

FIG. 11

| CASE 6 | acceleration performance improvement mode |
|---|---|
| situation | rapid acceleration (longitudinal acceleration and air pressure inversely proportional) |
| condition | - launch control ON, more than 80% compared to WOT (ACC pedal)<br>- vehicle acceleration (G) sensor: greater than 1G front and rear occurs |

| Position | | Air pressure | Contact area | Rolling resistance |
|---|---|---|---|---|
| 2 (A2) | front | normal | normal | normal |
| 1 (A1) | front | normal | normal | normal |
| 4 (A4) | rear | decrease | increase | increase |
| 3 (A3) | rear | decrease | increase | increase |

← vehicle front

FIG. 12

| CASE 7 | ride comfort improvement mode |
|---|---|
| situation | rough road driving |
| condition | – pavement-detecting outdoor camera: identifies rough road and speed bumps<br>– navigation: location of rough road |

| 2 | A2 | | air pressure | decrease | | 4 | A4 | | air pressure | decrease |
|---|---|---|---|---|---|---|---|---|---|---|
| | | | contact area | increase | | | | | contact area | increase |
| | | | rolling resistance | increase | | | | | rolling resistance | increase |
| 1 | A1 | | air pressure | decrease | | 3 | A3 | | air pressure | decrease |
| | | | contact area | increase | | | | | contact area | increase |
| | | | rolling resistance | increase | | | | | rolling resistance | increase |

← vehicle front

CONTROL DEVICE AND METHOD FOR VARIABLE TIRE PRESSURE

CROSS REFERENCE TO RELATED APPLICATION

The present application claims priority to Korean Patent Application No. 10-2021-0130137, filed Sep. 30, 2021, the entire contents of which is incorporated herein for all purposes by this reference.

BACKGROUND OF THE PRESENT DISCLOSURE

Field of the Present Disclosure

The present disclosure relates to a control apparatus and method for varying tire pressure, and more particularly, to a technology for a control apparatus and method for varying tire pressure of a vehicle that can improve fuel efficiency, energy efficiency, and driving performance by individually controlling tire pressures of the front and rear wheels according to conditions such as driving information and road information.

Description of Related Art

In general, an electric vehicle is a vehicle that runs on electrical energy generated from a high-voltage battery. Although an electric vehicle has the advantage of being eco-friendly, it has the disadvantage of having a short driving range.

The most intuitive way to improve the driving range of an electric vehicle is to increase the storage capacity of the battery.

However, the present method has clear limitations for each vehicle class due to cost increase and vehicle layout constraints.

Accordingly, other methods are being developed to improve energy efficiency rather than improving the battery itself, and typical methods include application of a regenerative braking system that retrieves used driving force, diversification of designs for aerodynamic improvement, use of solar panels for self-generation, and driving force distribution for optimization of driving logic.

Tires are deeply involved in rolling resistance, which accounts for a large portion of a vehicle's driving resistance. The main cause of rolling resistance is energy loss stemming from the size of a contact patch, which is the contact area between tire and ground, and the friction characteristics. Therefore, reducing the friction force on the contact patch reduces rolling resistance, which is a great help in improving fuel efficiency and energy efficiency.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a control apparatus and method for varying tire pressure that can improve fuel efficiency, energy efficiency, and driving performance by applying a bimetal to a rim portion of a wheel, inducing deformation of the bimetal by applying current to the bimetal according to conditions such as driving information and road information, and individually controlling air pressures of four tires of the front and rear wheels through the deformation of the bimetal.

In various aspects of the present disclosure, there is provided a control apparatus configured for varying tire pressure, the device including: a bimetal replacing a rim portion of a wheel and configured to change a tire pressure by deforming when an electric current is applied to the bimetal; and a controller configured to control the electric current applied to the bimetal by use of information of an input unit electrically connected to the controller.

The bimetal may be provided on each of left and right front wheels and left and right rear wheels of a vehicle, and may be individually operated by the controller.

When the bimetal is deformed to protrude toward a tire of the vehicle, the tire pressure may increase and when the bimetal is deformed to protrude in an opposite direction of the tire, the tire pressure may decrease.

The input unit may include a navigation, an acceleration (G) sensor, a weight sensor, an indoor ultrasonic sensor, an external camera, and a tire pressure sensor.

The bimetal may be a thermal expansion type bimetal or an electromagnetic induction type bimetal.

Furthermore, a control method for varying tire pressure, according to an exemplary embodiment of the present disclosure, includes:
  selecting, by the controller, a mode for selecting one of a specified air pressure mode, a fuel economy improvement mode, a cornering performance improvement mode, a braking performance improvement mode, an acceleration performance improvement mode, a ride comfort improvement mode, and a driving stability improvement mode by use of information transmitted from an input unit; and
  controlling, by the controller, an air pressure in the tire for varying the tire pressure by controlling current applied to the bimetal of a wheel according to a mode selected in the selecting a mode.

The bimetal may be provided on each of left and right front wheels and left and right rear wheels of a vehicle, and may be individually controlled.

The bimetal may be configured to replace a rim portion of a wheel, and when the bimetal is deformed to protrude toward a tire of the vehicle, the tire pressure may increase and when the bimetal is deformed to protrude in an opposite direction of the tire, the tire pressure may decrease.

In the specified air pressure mode, which refers to a general city road driving situation, air pressures of left and right front tires and air pressures of left and right rear tires may be all controlled at a predetermined pressure.

In the fuel economy improvement mode, which refers to one of a first situation of cruising on a highway or high-speed road, and a second situation in which a load weight of rear seat passengers or in a trunk of the vehicle is greater than a reference value, and in the case of the first situation, air pressures of left and right front tires and air pressures of left and right rear tires may be all controlled to an increased pressure higher than a predetermined pressure.

In the case of the second situation, air pressures of left and right front tires are controlled at the predetermined pressure, and air pressures of left and right rear tires are controlled to an increased pressure higher than the predetermined pressure.

In the cornering performance improvement mode, which refers to a vehicle turning situation, air pressures of left and right front tires are controlled to a reduced pressure lower than a predetermined pressure, and air pressures of left and right rear tires are controlled at the predetermined pressure.

In the braking performance improvement mode, which refers to a rapid deceleration situation, air pressures of left and right front tires are controlled to a reduced pressure lower than a predetermined pressure, and air pressures of left and right rear tires are controlled at the predetermined pressure.

In the acceleration performance improvement mode, which refers to a rapid acceleration situation, air pressures of left and right front tires are controlled at a predetermined pressure, and air pressures of left and right rear tires are controlled to a reduced pressure lower than the predetermined pressure.

In the ride comfort improvement mode, which refers to a rough road driving situation, air pressures of left and right front tires and air pressures of left and right rear tires are all controlled to a reduced pressure lower than a predetermined pressure.

In the driving stability improvement mode, which refers to a slope driving situation which is one of a left slope with low left and high right of the vehicle, a right slope with high left and low right of the vehicle, an uphill slope with high front and low back of the vehicle, and a downhill slope with high bottom and high back of the vehicle, and in the left slope situation, air pressures of left tires of front and rear wheels are all controlled to an increased pressure higher than a predetermined pressure, and air pressures of right tires of front and rear wheels are all controlled to a reduced pressure lower than the predetermined pressure.

In the right slope situation, air pressures of left tires of front and rear wheels are all controlled to the reduced pressure lower than the predetermined pressure, and air pressures of right tires of front and rear wheels are all controlled to an increased pressure higher than the predetermined pressure.

In the uphill slope situation, air pressures of left and right front tires are all controlled to the reduced pressure lower than the predetermined pressure, and air pressures of left and right rear tires are all controlled to an increased pressure higher than the predetermined pressure.

In the downhill slope situation, air pressures of left and right front tires are all controlled to the increased pressure higher than the predetermined pressure, and air pressures of left and right rear tires are all controlled to the reduced pressure lower than the predetermined pressure.

According to the exemplary embodiment of the present disclosure, the control apparatus and method for varying tire pressure is configured such that, a bimetal is applied to a rim portion of a wheel, deformation of the bimetal is induced by applying current to the bimetal according to conditions such as driving information and road information, and air pressures of four tires of the front and rear wheels are individually controlled through the deformation of the bimetal, thus improving fuel efficiency, energy efficiency, and driving performance.

Fuel efficiency and energy efficiency may be improved by reducing rolling resistance when a vehicle operates at cruising mode, and the air pressure of individual tires may be adjusted according to situations such as turning, acceleration, and deceleration, and rough road conditions, improving ride comfort and handling stability.

Furthermore, the shape of the contact patch may be changed by individually controlling the air pressure of the tires of the front and rear wheels, and by changing the shape of the contact patch, so it is possible to avoid the frequency band in which tire pattern noise is generated and thus reduce road noise. Also, it is possible to secure a stable grip of the tire even in snowy or rainy conditions, improving driving stability.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 6, FIG. 7, FIG. 8, FIG. 9, FIG. 10, FIG. 11, FIG. 12 and FIG. 13 are views exemplarily illustrating a control method for varying tire pressure for each mode according to conditions such as driving information and road information according to an exemplary embodiment of the present disclosure.

Figure 1:
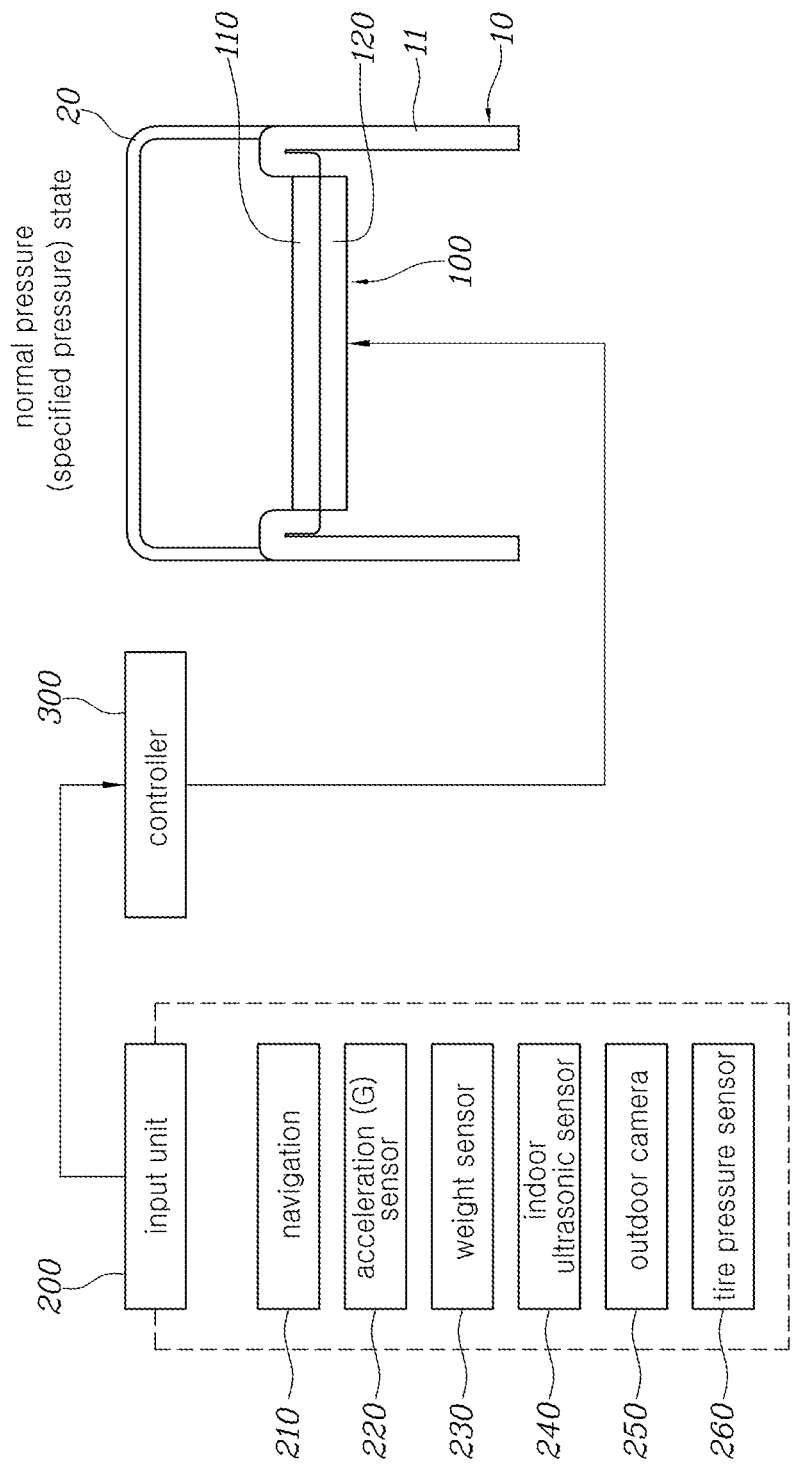
FIG. 1 is a view exemplarily illustrating a control apparatus configured for varying tire pressure according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural and functional descriptions of embodiments of the present disclosure disclosed herein are only for illustrative purposes of the exemplary embodiments of the present disclosure. The present disclosure may be embodied in various forms without departing from the spirit and significant characteristics of the present disclosure. Therefore, the exemplary embodiments of the present disclosure are disclosed only for illustrative purposes and should not be construed as limiting the present disclosure.

Reference will now be made in detail to various embodiments of the present disclosure, specific examples of which are illustrated in the accompanying drawings and described below, because the exemplary embodiments of the present disclosure may be variously modified in various forms. While the present disclosure will be described in conjunction with exemplary embodiments thereof, it is to be understood that the present description is not intended to limit the present disclosure to those exemplary embodiments of the present disclosure. On the other hand, the present disclosure is directed to cover not only the exemplary embodiments of the present disclosure, but also various alternatives, modifications, equivalents and other embodiments which may be included within the spirit and scope of the present disclosure as defined by the appended claims.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it may be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

The terminology used herein is for describing various exemplary embodiments only and is not intended to be limiting. As used herein, the singular forms "a", "an", and "the" are intended to include the plural forms as well, unless the context clearly indicates otherwise. It will be further understood that the terms "comprise", "include", "have", etc. When used in the exemplary embodiment, specify the presence of stated features, integers, steps, operations, elements, components, and/or combinations thereof but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

A controller according to various exemplary embodiments of the present disclosure may be implemented through an algorithm configured to control the operation of various components of a vehicle or a non-volatile memory configured to store data regarding software instructions for executing the algorithm, and a processor configured to perform the operations described below using data stored in that memory. Here, the memory and the processor may be implemented as separate chips. Alternatively, the memory and processor may be implemented as a single integrated chip. A processor may take the form of one or more processors.

Hereinbelow, a control device and method for varying tire pressure according to exemplary embodiments of the present disclosure will be described in detail with reference to the accompanying drawings.

Various aspects of the present disclosure are directed to providing a technology that can improve fuel efficiency, energy efficiency, and driving performance by controlling air pressures of the four tires of the front and rear wheels to be individually adjusted according to the conditions such as driving situation, pavement information, and road information.

The change in tire pressure is directly related to the change in the area of tire contacting ground (contact patch) and the change in stiffness.

Air in tires is monitored through a Tire Pressure Monitoring System (TPMS) sensor, and air pressure may be adjusted through a separate actuator.

The exemplary embodiment according to an exemplary embodiment of the present disclosure utilizes a bimetal as an actuator for regulating the air pressure of a tire.

The bimetal whose deformation is induced by the difference in resistance forms a rim portion of a wheel, and when an electric current is applied to the bimetal, the bimetal deforms in the tire direction or in the opposite direction to change the tire volume to decrease or increase, controlling tire pressure to be adjusted.

As shown in FIG. 1, the control device configured for varying tire pressure according to various exemplary embodiments of the present disclosure may include a bimetal 100 configured to replace a rim portion of a wheel 10 and change air pressure in a tire 20 by deforming when an electric current is applied; and a controller 300 configured to control the electric current applied to the bimetal 100 by use of information of an input unit 200.

The wheel 10 of a vehicle is a portion to which the tire 20 is coupled, and includes a hub in the center, a rim forming an external edge portion, and a plurality of spokes 11 connecting the hub and the rim, and the tire 20 is coupled to the rim.

According to an exemplary embodiment of the present disclosure, the portion forming the rim portion of the wheel 10 includes a bimetal 100, the bimetal 100 is electrically connected to the power supply through a wire, and the controller 300 may control the electric current applied to the bimetal 100 through operation control of the power supply device.

The bimetal 100 is configured by combining a thin first metal 110 and a second metal 120 with each other, is configured to form the rim portion of the wheel 10, and air is filled into the space between the bimetal 100 and the tire 20 to form tire pressure.

The bimetal 100 according to an exemplary embodiment of the present disclosure is provided on each of the left and right front wheels and the left and right rear wheels, and is configured to be operated individually by the controller 300.

FIG. 1 shows a state in which the bimetal 100 is in a balanced state as it is not deformed. At the instant time, the air pressure of the tire 20 is maintained at a normal pressure corresponding to the predetermined pressure for each tire.

Figure 2:
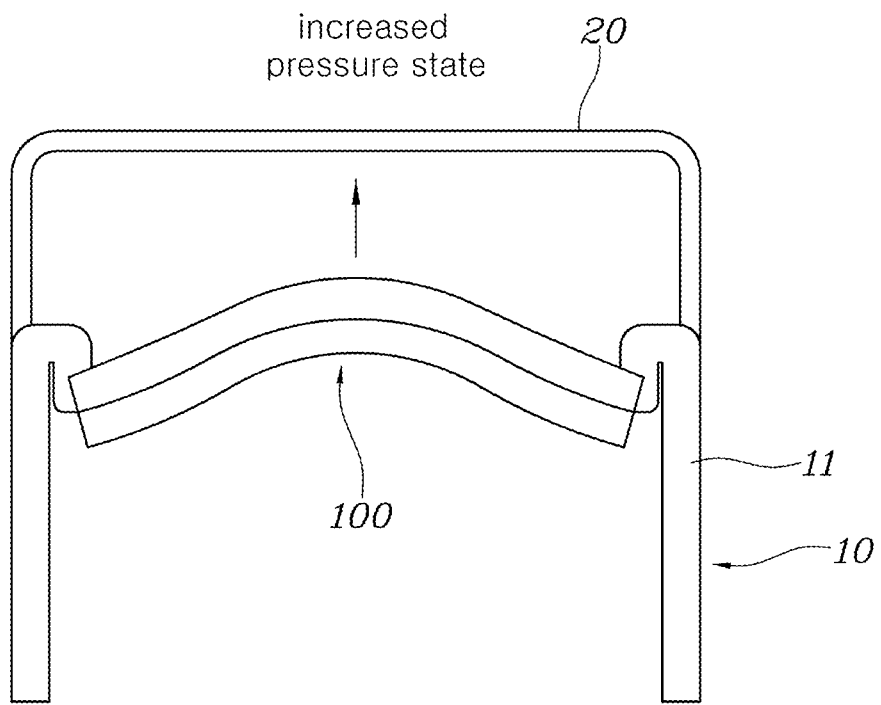
FIG. 2 and FIG. 3 are views of an increased state and a reduced state of air pressure of a tire according to an exemplary embodiment of the present disclosure.

When a current is applied to the bimetal 100 and the bimetal 100 is deformed to protrude toward the tire 20 as shown in FIG. 2, the air pressure of the tire 20 increases. When the air pressure of the tire 20 increases, the contact area with the road surface decreases, and fuel efficiency and energy efficiency are improved.

Figure 3:
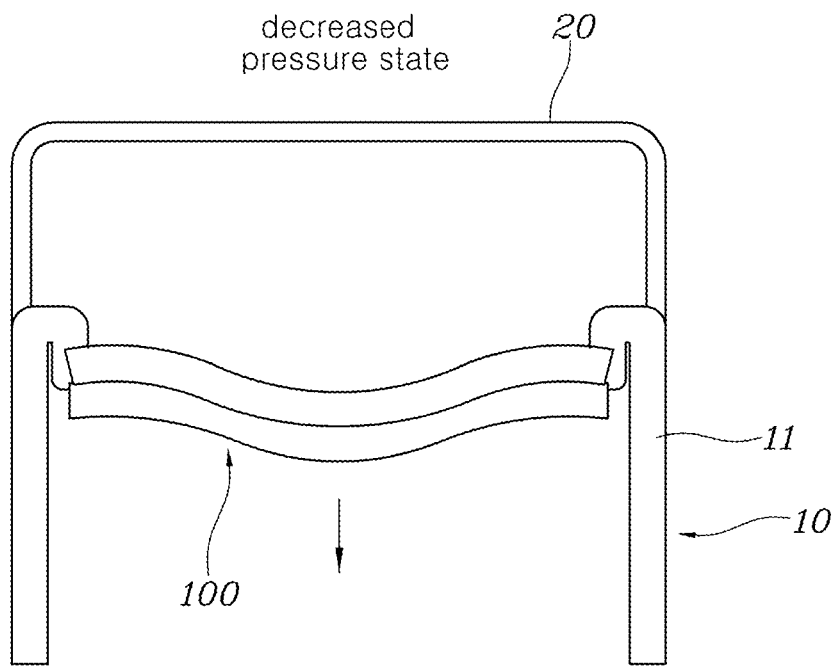

Conversely, when a current is applied to the bimetal 100 and the bimetal 100 is deformed to protrude in the opposite direction of the tire 20 (the direction toward the hub of the wheel) as shown in FIG. 3, the air pressure of the tire 20 is reduced. When the air pressure of the tire 20 decreases, the contact area with the road surface increases, and fuel efficiency and energy efficiency decrease.

The input unit 200 according to an exemplary embodiment of the present disclosure includes a navigation 210, an acceleration (G) sensor 220, a weight sensor 230, an indoor ultrasonic sensor 240, an external camera 250, and a tire pressure sensor 260.

Through the navigation 210, it is possible to obtain information on slope, road turning radius, weather, city roads, intercity roads, and highways.

Current information related to the yaw, pitch, and roll motions of a vehicle may be obtained through the acceleration (G) sensor 220, and information on the weight of passengers and loads compared to Curb Vehicle Weight (CVW) may be obtained through the weight sensor 230. Through the indoor ultrasonic sensor 240, it is possible to check the relative position information between the passenger and the load and the vehicle.

The pavement information for electronic control suspension (ECS) may be obtained through the external camera 250, and tire pressure information of each wheel may be obtained through the tire pressure sensor 260.

The bimetal 100 used in an exemplary embodiment of the present disclosure may be a thermal expansion type bimetal or an electromagnetic induction type bimetal.

Figure 4:
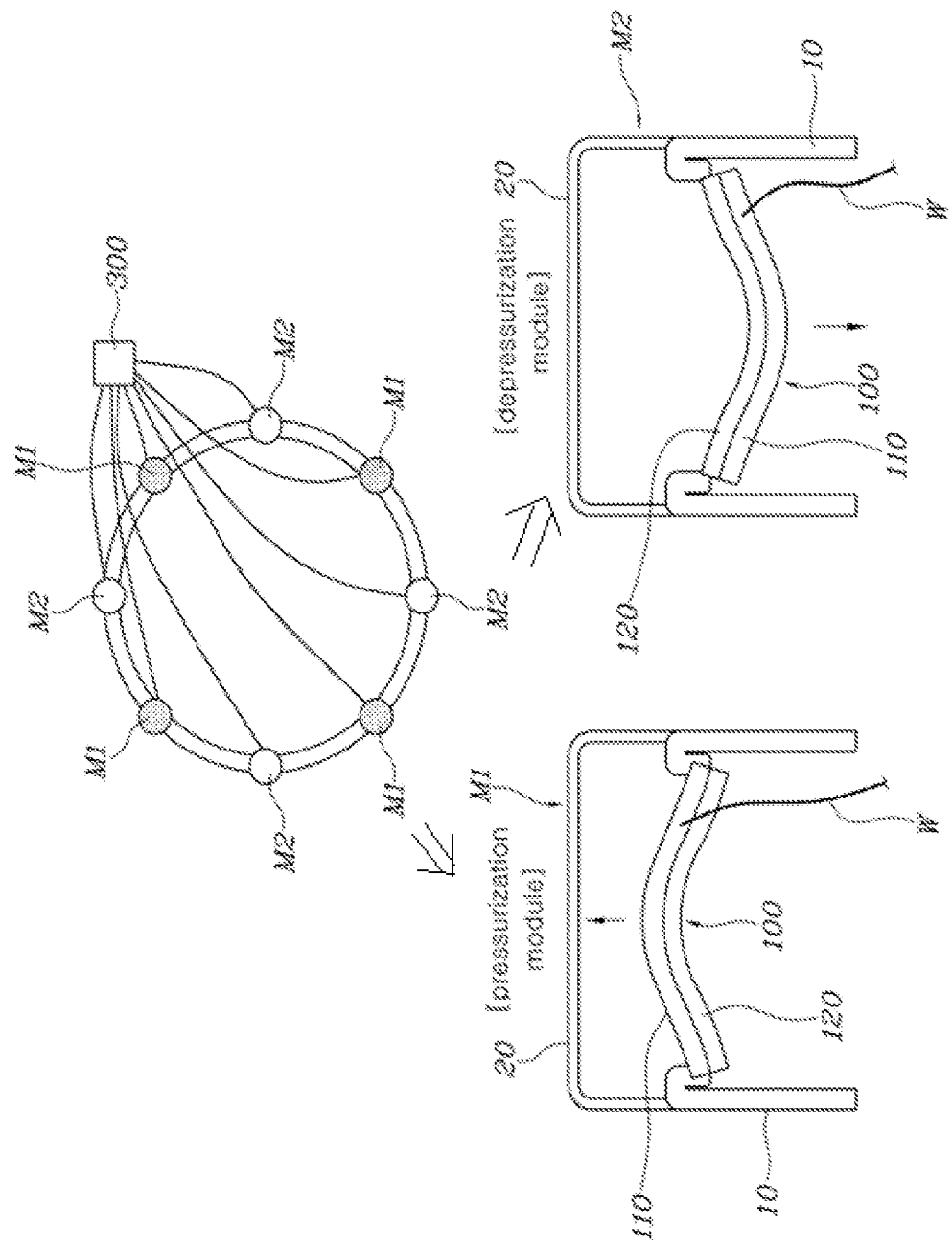
FIG. 4 and FIG. 5 are views exemplarily illustrating a thermal expansion type bimetal and an electromagnetic induction type bimetal.

In the case of thermal expansion type bimetal, when a current is applied to the bimetal 100 having a coefficient of thermal expansion (CTE) of which the first metal 110 is greater than that of the second metal 120 as in FIG. 4, a temperature difference is generated due to the difference in resistance value, and the metal is bent in one direction due to the different CTEs.

Because the thermal expansion type bimetal bends only to one side with a larger CTE when an electric current is applied, a pressurization module M1 and a depressurization module M2 are alternately arranged one by one in the circumferential direction of the wheel 10 to adjust the air pressure.

The pressurization module M1 is disposed so that the first metal 110 having a larger CTE faces toward the tire 20 whereas the depressurization module M2 is disposed so that the second metal 120 having a smaller coefficient of thermal expansion faces toward the tire 20.

During pressurization, the pressurization module M1 is in a current ON state and the depressurization module M2 is in a current OFF state, whereas during depressurization, the pressurization module M1 is in a current OFF state and the depressurization module M2 is in a current ON state, and the change in tire pressure is proportional to the current.

Figure 5:
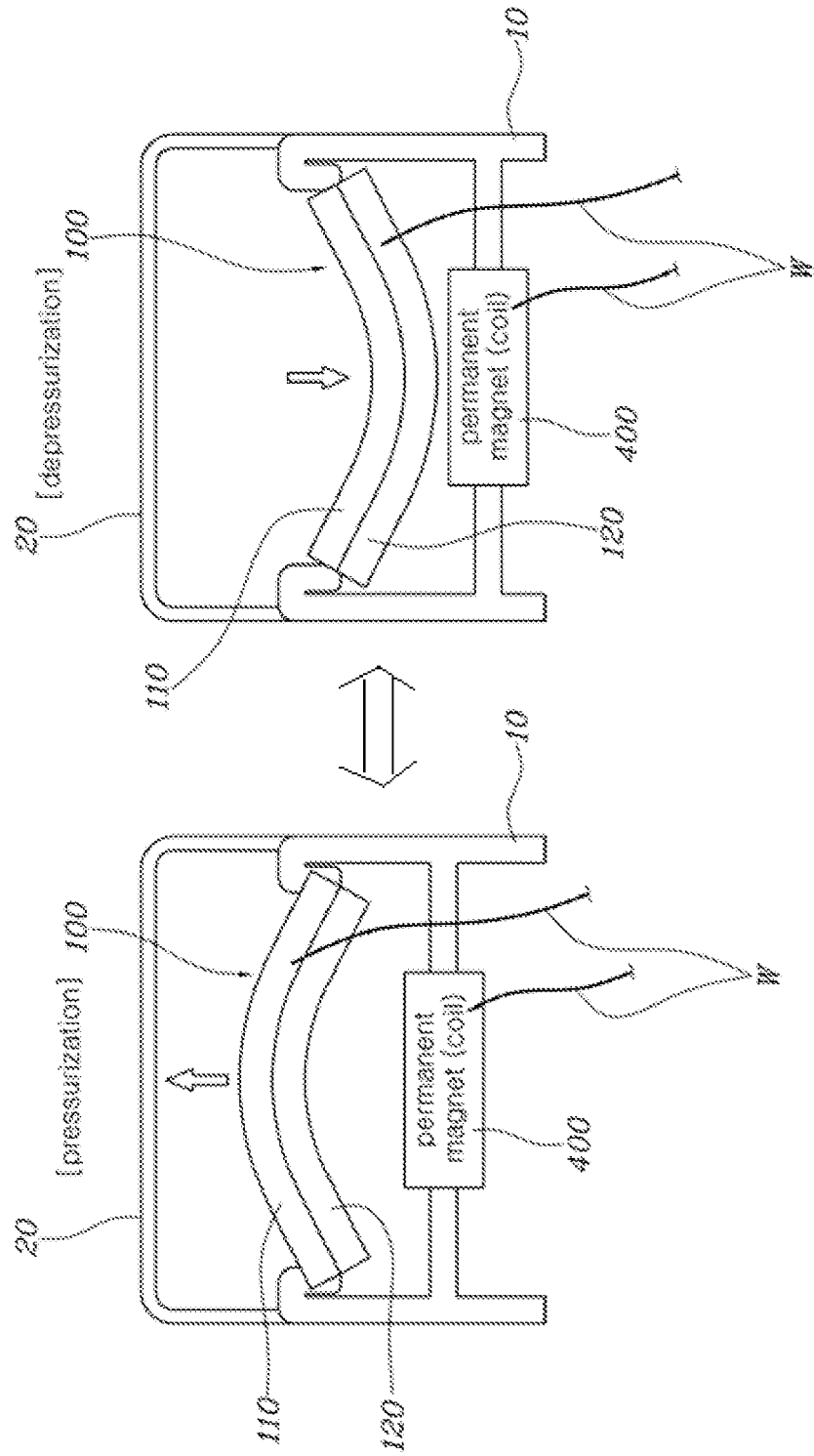

In the case of electromagnetic induction type bimetal, as in FIG. 5, the first metal 110 (stainless) having little conductivity and the second conductive metal 120 are joined together with an epoxy adhesive or by mechanical bonding, and deformed by the magnetic force of the coil-type permanent magnet 400 disposed at the bottom.

This may be seen as a kind of semiconductor method because after applying an electric current to the bimetal 100 to positively charge it or negatively charge it, by applying a current to the coil-type permanent magnet 400 located at the bottom portion, the direction and strength of the magnetic force may be adjusted, thus the bimetal 100 can move up and down.

When pressurized, the bimetal 100 is negatively charged, the permanent magnet 400 is in a current ON state, and when the depressurized, the bimetal 100 is positively charged and the permanent magnet 400 is in a current ON state, and the change in tire pressure is proportional to the size of the current.

Unexplained reference numeral W shown in FIG. 4 and FIG. 5 is a wire for applying a current.

Hereinafter, a control method for varying tire pressure according to an exemplary embodiment of the present disclosure will be described.

The control method according to various exemplary embodiments of the present disclosure may include selecting, by the controller, a mode for selecting one of a specified air pressure mode, a fuel economy improvement mode, a cornering performance improvement mode, a braking performance improvement mode, an acceleration performance improvement mode, a ride comfort improvement mode, and a driving stability improvement mode using information transmitted from an input unit; and controlling, by the controller, an air pressure in the tire for varying the tire pressure by controlling current applied to the bimetal of a wheel according to a mode selected in the selecting a mode.

The bimetal 100 is provided on each of left and right front wheels and left and right rear wheels of a vehicle, and is individually controlled.

The bimetal 100 is configured to replace a rim portion of a wheel 10, so when the bimetal 100 is deformed to protrude toward the tire 20, air pressure of the tire 20 increases as the area of space filled with air in the tire 20 decreases, whereas when the bimetal 100 is deformed to protrude in the opposite direction of the tire 20, air pressure of the tire 20 decreases as the area of space filled with air of the tire 20 increases.

Figure 6:
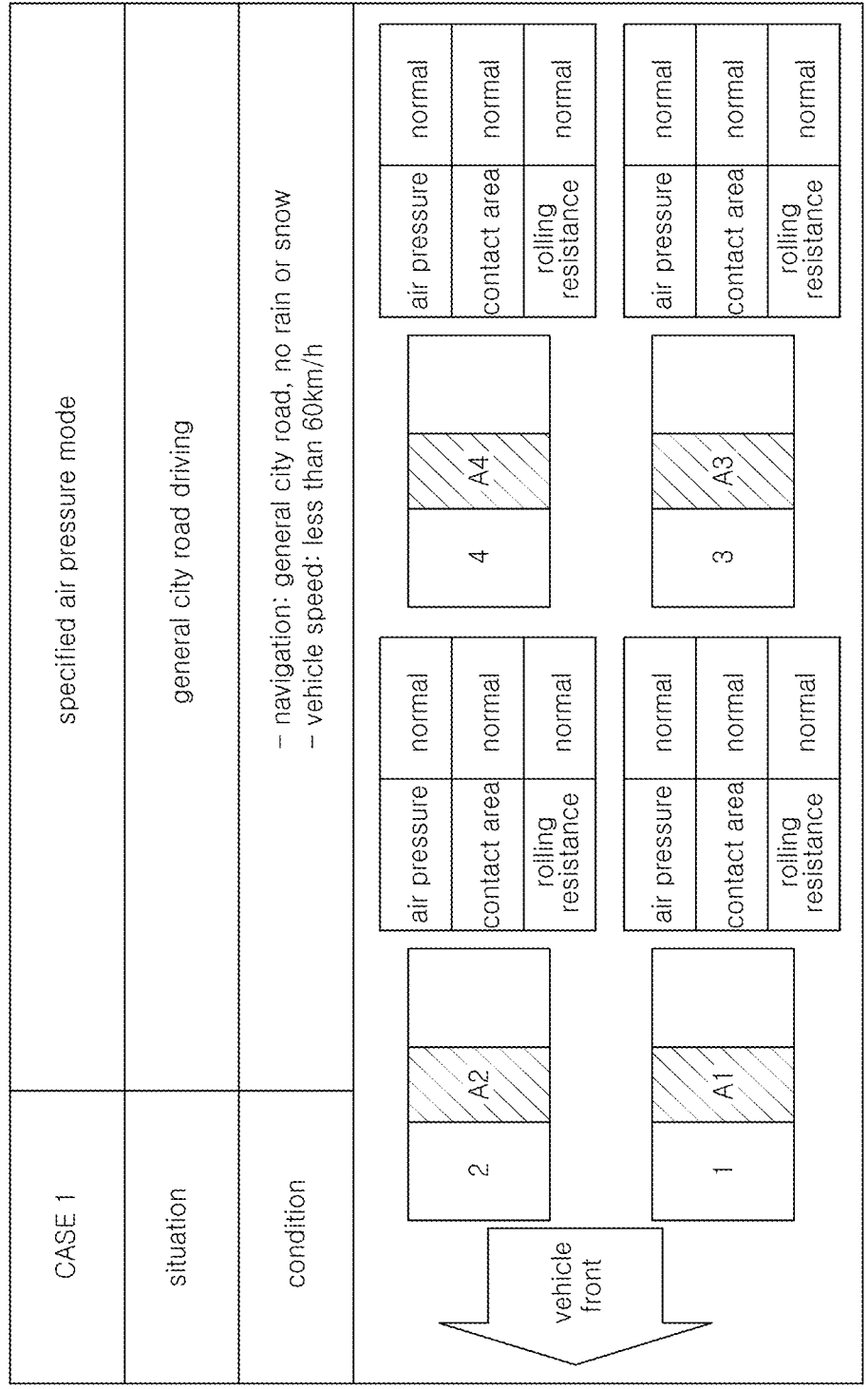

FIG. 6 shows a method of controlling air pressure of a tire in the specified air pressure mode.

The specified air pressure mode refers to a general city road driving situation. The condition is that the navigation information is a general city road, there is no rain or snow, and the vehicle speed is less than 60 km/h.

In the specified air pressure mode, air pressures of the left and right tires 1, 2 of the front wheel and the air pressures of the left and right tires 3, 4 of the rear wheel are all controlled to maintain the normal pressure, which is the predetermined pressure.

When the tire pressure is controlled to the normal pressure, which is the predetermined pressure, the contact areas A1, A2 of the front left and right tires 1, 2 and the contact areas A3, A4 of the rear left and right tires 3, 4 are all maintained in a normal state corresponding to the specified condition, and the rolling resistance is also maintained at a normal state corresponding to the specified condition.

If the tire pressure is controlled to an increased pressure higher than the normal pressure, which is the predetermined pressure, the contact area is reduced from the normal size, which is the specified condition, and the rolling resistance is reduced from the normal level, which is the specified condition.

Conversely, if the tire pressure is controlled to a pressure lower than the normal pressure, which is the predetermined pressure, the contact area is increased from the normal size, which is the specified condition, and the rolling resistance is also increased from the normal level, which is the specified condition.

FIGS. 7 to 8 show a method of controlling the air pressure of a tire in the fuel economy improvement mode.

The fuel economy improvement mode of FIG. 7 refers to a first situation of cruising on a highway or high-speed road. The condition is that the navigation information is a highway or high-speed road, there is no rain or snow, and the vehicle speed is greater than 60 km/h.

In the fuel economy improvement mode of FIG. 7, the air pressures of the left and right tires 1, 2 of the front wheel and the air pressures of the left and right tires 3, 4 of the rear wheel are all controlled to maintain a pressure increased from the normal pressure, which is the predetermined pressure.

When the tire pressure is controlled to an increased pressure higher than the normal pressure, which is the predetermined pressure, the contact areas A1, A2 of the front left and right tires 1, 2 and the contact areas A3, A4 of the rear left and right tires 3, 4 are all reduced than normal, which meets the specified condition, and rolling resistance is reduced from normal, which is the specified condition.

The fuel economy improvement mode of FIG. 8 refers to a second situation (excessive weight situation) in which a load weight of rear seat passengers or in a trunk of the vehicle is greater than a reference value. The condition is that the axle load ratio of the front wheel and the rear wheel exceeds 10% in the stopped state, and the information of the indoor ultrasonic sensor 240 is that the position of the rear passengers is confirmed.

In the fuel economy improvement mode of FIG. 8, the air pressures of the left and right tires 1, 2 of the front wheel are all controlled to maintain a normal pressure, which is a normal pressure, which is the predetermined pressure, and the air pressures of the left and right tires 3, 4 of the rear wheel are controlled to maintain a pressure increased from the normal pressure.

Accordingly, the contact areas A1, A2 of the left and right front tires 1, 2 are maintained in a normal state corresponding to the specified condition, and the rolling resistance is also maintained in a normal state corresponding to the specified condition.

Furthermore, the contact areas A3, A4 of the left and right rear tires 3, 4 are all reduced from the normal corresponding to the specified condition, and the rolling resistance is reduced from the normal level, which is the specified condition.

Figure 9:
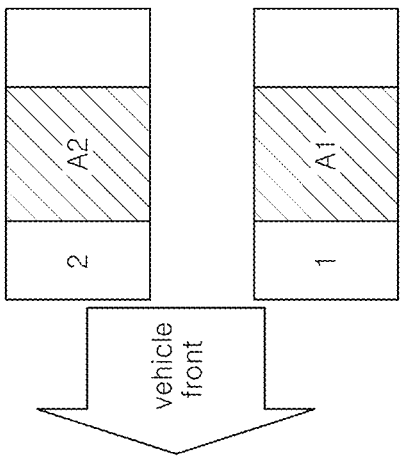
Figure 13:
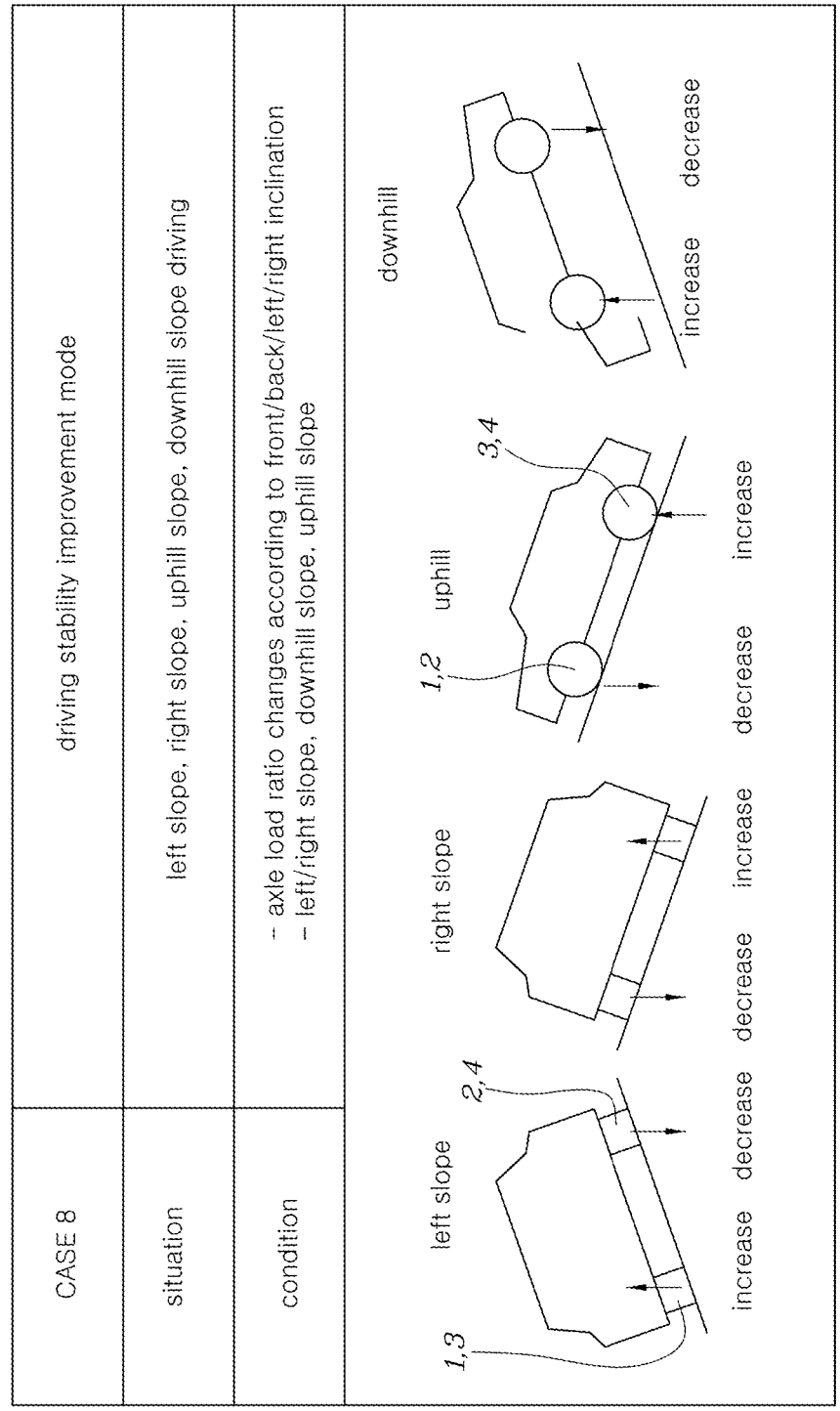

FIG. 9 shows a method of controlling the air pressure of a tire in the cornering performance improvement mode.

The cornering performance improvement mode refers to a vehicle turning situation. The condition is that the navigation information is a sharp curve in the front, and the vehicle acceleration (G) sensor presents a value greater than 1G left and right.

In the cornering performance improvement mode, the air pressures of the left and right tires 1, 2 of the front wheel are controlled to maintain a pressure reduced from the normal pressure, which is a predetermined pressure, and the air pressures of the left and right tires 3, 4 of the rear wheel are controlled to maintain the normal pressure.

Accordingly, the contact areas A1, A2 of the left and right front tires 1, 2 are increased compared to the normal condition corresponding to the specified condition, and the rolling resistance is also increased compared to the normal condition corresponding to the specified condition.

Furthermore, the contact areas A3, A4 of the left and right rear tires 3, 4 are maintained in a normal state corresponding to the specified condition, and the rolling resistance is also maintained in a normal state corresponding to the specified condition.

FIG. 10 shows a method of controlling the air pressure of a tire in the braking performance improvement mode.

The braking performance improvement mode refers to a rapid deceleration situation (a situation in which the longitudinal acceleration and air pressure are inversely proportional). The condition is that a wire and a rain sensor are ON, the navigation information is snow or rain, and the vehicle acceleration (G) sensor presents a value greater than 1G front and rear.

In the braking performance improvement mode, the air pressures of the left and right tires 1, 2 of the front wheel are controlled to maintain a pressure reduced from the normal pressure, which is a predetermined pressure, and the air pressures of the left and right tires 3, 4 of the rear wheel are controlled to maintain the normal pressure.

Accordingly, the contact areas A1, A2 of the left and right front tires 1, 2 are increased compared to the normal condition corresponding to the specified condition, and the rolling resistance is also increased compared to the normal condition corresponding to the specified condition.

Furthermore, the contact areas A3, A4 of the left and right rear tires 3, 4 are maintained in a normal state corresponding to the specified condition, and the rolling resistance is also maintained in a normal state corresponding to the specified condition.

FIG. 11 shows a method of controlling the air pressure of a tire in the acceleration performance improvement mode.

The acceleration performance improvement mode refers to a rapid accelerating situation (a situation in which the longitudinal acceleration and air pressure are inversely proportional). The condition is that a launch control is ON, a vehicle is accelerating at 80% or more throttle compared to Wide Open Throttle (WOT), and the vehicle acceleration (G) sensor presents a value greater than 1G front and rear.

In the acceleration performance improvement mode, the air pressures of the left and right tires 1, 2 of the front wheels are controlled to maintain a normal pressure which is a predetermined pressure, and the air pressures of the left and right tires 3, 4 of the rear wheels are controlled to maintain a pressure reduced from the normal pressure which is a predetermined pressure.

Accordingly, both the contact areas A1, A2 of the left and right front tires 1, 2 are maintained in a normal state corresponding to the specified condition, and the rolling resistance is also maintained in a normal state corresponding to the specified condition.

Furthermore, the contact areas A3, A4 of the left and right rear tires 3, 4 are all increased from the normal state corresponding to the specified condition, and the rolling resistance is also increased from the normal state corresponding to the specified condition.

FIG. 12 shows a method of controlling the air pressure of a tire in the ride comfort improvement mode.

The ride comfort improvement mode refers to a rough road driving situation. The condition is that rough road and speed bumps are identified using pavement-detecting external camera 250 information, and the location of rough road is determined using navigation information.

In the ride comfort improvement mode, the air pressures of the left and right tires 1, 2 of the front wheel and the air pressures of the left and right tires 3, 4 of the rear wheel are all controlled to maintain a pressure reduced from the normal pressure, which is a predetermined pressure.

Accordingly, the contact areas A1, A2 of the front left and right tires 1, 2 and the contact areas A3, A4 of the left and right rear tires 3, 4 are all increased from the normal condition corresponding to the specified condition, and the rolling resistance is also increased from the normal condition corresponding to the specified condition.

FIG. 12 shows a method of controlling the air pressure of a tire in the driving stability improvement mode.

The driving stability improvement mode refers to a slope driving situation that is one of a left slope with low left and high right of the vehicle, a right slope with high left and low right of the vehicle, an uphill slope with high front and low back of the vehicle, and a downhill slope with low front and high back, and in the left slope situation. The condition is that the axle load ratio is changed according to the front and rear and left and right inclinations.

In the left slope situation, air pressures of the left tires 1, 3 of front and rear wheels are all controlled to an increased pressure higher than a predetermined pressure, and air pressures of right tires 2, 4 of front and rear wheels are all controlled to a reduced pressure lower than the normal pressure.

In the right slope situation, air pressures of the left tires 1, 3 of front and rear wheels are all controlled to the reduced pressure lower than the normal pressure, which is the predetermined pressure, and air pressures of right tires 2, 4 of front and rear wheels are all controlled to an increased pressure higher than the normal pressure.

In the uphill slope situation, air pressures of left and right front tires 1, 2 are all controlled to the reduced pressure lower than the normal pressure, which is the predetermined pressure, and air pressures of left and right rear tires 3, 4 are all controlled to an increased pressure higher than the normal pressure.

Finally, in the downhill slope situation, air pressures of left and right front tires 1, 2 are all controlled to the increased pressure higher than the normal pressure, which is the predetermined pressure, and air pressures of left and right rear tires 3, 4 are all controlled to the reduced pressure lower than the normal pressure.

As described above, the exemplary embodiment according to an exemplary embodiment of the present disclosure is configured such that, a bimetal 100 is applied to a rim portion of a wheel 10, deformation of the bimetal 100 is induced by applying current to the bimetal 100 according to conditions such as driving information and road information, and air pressures of four tires 1, 2, 3, and 4 of the front and rear wheels are individually controlled through the deformation of the bimetal 100, thus improving fuel efficiency, energy efficiency, and driving performance.

Fuel efficiency and energy efficiency may be improved by reducing rolling resistance when a vehicle operates at cruising mode, and the air pressure of individual tires may be adjusted according to situations such as turning, acceleration, and deceleration, and rough road conditions, improving ride comfort and handling stability.

Furthermore, the shape of the contact patch may be changed by individually controlling the air pressure of the tires of the front and rear wheels, and by changing the shape of the contact patch, it is possible to avoid the frequency band in which tire pattern noise is generated and thus reduce road noise. Also, it is possible to secure a stable grip of the tire even in snowy or rainy conditions, improving driving stability.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A control apparatus for varying tire pressure, the control apparatus comprising:
   a bimetal replacing a rim portion of a wheel coupled to a tire and configured to change the tire pressure by deforming when an electric current is applied to the bimetal; and
   a controller configured to control the electric current applied to the bimetal by use of information of an input unit electrically connected to the controller.

2. The control apparatus of claim 1, wherein the bimetal is provided on each of left and right front wheels and left and right rear wheels of a vehicle, and is individually operated by the controller.

3. The control apparatus of claim 1, wherein when the bimetal is deformed to protrude toward the tire of a vehicle, the tire pressure increases and when the bimetal is deformed to protrude in an opposite direction of the tire, the tire pressure decreases.

4. The control apparatus of claim 1, wherein the input unit includes a navigation, an acceleration (G) sensor, a weight sensor, an indoor ultrasonic sensor, an external camera, and a tire pressure sensor.

5. The control apparatus of claim 1, wherein the bimetal is a thermal expansion type bimetal or an electromagnetic induction type bimetal.

6. The control apparatus of claim 5, wherein in the thermal expansion type bimetal, a pressurization module and a depressurization module are alternately arranged one by one in a circumferential direction of the wheel to adjust an air pressure in the tire.

7. A control method for varying the tire pressure by use of the control apparatus of claim 1, the method comprising:
   selecting, by the controller, a mode for selecting one mode of a specified air pressure mode, a fuel economy improvement mode, a cornering performance improvement mode, a braking performance improvement mode, an acceleration performance improvement mode, a ride comfort improvement mode, and a driving stability improvement mode by use of the information transmitted from the input unit; and
   controlling, by the controller, an air pressure in the tire of a vehicle for varying the tire pressure by controlling the electric current applied to the bimetal of the wheel according to the selected one mode.

8. The method of claim 7, wherein the bimetal is provided on each of left and right front wheels and left and right rear wheels of the vehicle, and is individually controlled.

9. The method of claim 7, wherein the bimetal replaces the rim portion in each of the left and right front wheels and the left and right rear wheels, and when the bimetal is deformed to protrude toward the tire of the vehicle, the tire pressure increases and when the bimetal is deformed to protrude in an opposite direction of the tire, the tire pressure decreases.

10. The method of claim 7, wherein in the specified air pressure mode, which refers to a general city road driving situation, air pressures of left and right front tires and air pressures of left and right rear tires are all controlled at a predetermined pressure.

11. The method of claim 7,
   wherein the fuel economy improvement mode refers to one of a first situation of cruising on a highway or high-speed road, and a second situation in which a load weight of rear seat passengers or in a trunk of the vehicle is greater than a reference value, and
   wherein in the first situation, air pressures of left and right front tires and air pressures of left and right rear tires are all controlled to an increased pressure higher than a predetermined pressure.

12. The method of claim 11, wherein in the second situation, the air pressures of the left and right front tires are controlled at the predetermined pressure, and the air pressures of the left and right rear tires are controlled to an increased pressure higher than the predetermined pressure.

13. The method of claim 7, wherein in the cornering performance improvement mode, which refers to a vehicle turning situation, air pressures of left and right front tires are controlled to a reduced pressure lower than a predetermined pressure, and air pressures of left and right rear tires are controlled at the predetermined pressure.

14. The method of claim 7, wherein in the braking performance improvement mode, which refers to a rapid deceleration situation, air pressures of left and right front tires are controlled to a reduced pressure lower than a predetermined pressure, and air pressures of left and right rear tires are controlled at the predetermined pressure.

15. The method of claim 7, wherein in the acceleration performance improvement mode, which refers to a rapid acceleration situation, air pressures of left and right front tires are controlled at a predetermined pressure, and air pressures of left and right rear tires are controlled to a reduced pressure lower than the predetermined pressure.

16. The method of claim 7, wherein in the ride comfort improvement mode, which refers to a rough road driving situation, air pressures of left and right front tires and air pressures of left and right rear tires are all controlled to a reduced pressure lower than a predetermined pressure.

17. The method of claim 7,
   wherein the driving stability improvement mode refers to a slope driving situation which is one of a left slope with low left and high right of the vehicle, a right slope with high left and low right of the vehicle, an uphill slope with high front and low back of the vehicle, and a downhill slope with high bottom and high back of the vehicle, and
   wherein in the left slope situation, air pressures of left tires of front and rear wheels are all controlled to an increased pressure higher than a predetermined pressure, and air pressures of right tires of front and rear wheels are all controlled to a reduced pressure lower than the predetermined pressure.

18. The method of claim 17, wherein in the right slope situation, the air pressures of the left tires of the front and rear wheels are all controlled to the reduced pressure lower than the predetermined pressure, and the air pressures of the right tires of the front and rear wheels are all controlled to an increased pressure higher than the predetermined pressure.

19. The method of claim 17, wherein in the uphill slope situation, the air pressures of the left and right front tires are all controlled to the reduced pressure lower than the predetermined pressure, and the air pressures of the left and right rear tires are all controlled to an increased pressure higher than the predetermined pressure.

20. The method of claim 17, wherein in the downhill slope situation, the air pressures of the left and right front tires are all controlled to the increased pressure higher than the predetermined pressure, and the air pressures of the left and right rear tires are all controlled to the reduced pressure lower than the predetermined pressure.

\* \* \* \* \*